(12) United States Patent
Zalewski

(10) Patent No.: US 9,275,402 B2
(45) Date of Patent: *Mar. 1, 2016

(54) ADVERTISEMENT SCHEME FOR USE WITH INTERACTIVE CONTENT

(71) Applicant: Sony Computer Entertainment America LLC, San Mateo, CA (US)

(72) Inventor: Gary M. Zalewski, Piedmont, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/528,950

(22) Filed: Oct. 30, 2014

(65) Prior Publication Data

US 2015/0051989 A1 Feb. 19, 2015

Related U.S. Application Data

(63) Continuation of application No. 13/189,219, filed on Jul. 22, 2011, now Pat. No. 8,879,891, which is a continuation of application No. 11/558,348, filed on Nov. 9, 2006, now Pat. No. 8,000,581.

(51) Int. Cl.
| | |
|---|---|
| *H04N 9/80* | (2006.01) |
| *G06Q 30/02* | (2012.01) |
| *G07F 17/32* | (2006.01) |
| *A63F 13/493* | (2014.01) |
| *A63F 13/61* | (2014.01) |

(52) U.S. Cl.
CPC .......... *G06Q 30/0277* (2013.01); *A63F 13/493* (2014.09); *A63F 13/61* (2014.09); *G06Q 30/02* (2013.01); *G06Q 30/0252* (2013.01); *G07F 17/32* (2013.01); *G07F 17/3255* (2013.01)

(58) Field of Classification Search
CPC .. G06Q 30/0252; G07F 17/32; G07F 17/3255
See application file for complete search history.

(56) References Cited

U.S. PATENT DOCUMENTS

| | | | |
|---|---|---|---|
| 6,716,103 | B1 | 4/2004 | Eck |
| 7,013,479 | B2 | 3/2006 | Mori |
| 7,418,191 | B2 | 8/2008 | Unger |
| 7,519,273 | B2 | 4/2009 | Lowthert |

(Continued)

FOREIGN PATENT DOCUMENTS

| | | |
|---|---|---|
| JP | 2001286609 | 10/2001 |
| JP | 2002273060 | 9/2002 |
| JP | 2002306838 | 10/2002 |

OTHER PUBLICATIONS

Chinese Patent Office; Decision of Rejection issued in Chinese Patent Application No. 200780049171.1, mailed Oct. 24, 2012, 11 pages.

(Continued)

*Primary Examiner* — Huy T Nguyen
(74) *Attorney, Agent, or Firm* — Fitch, Even, Tabin & Flannery, LLP

(57) ABSTRACT

A method for use in advertising includes initiating playing of interactive content, suspending playing of the interactive content, displaying an advertisement, and resuming playing of the interactive content. A computer program product includes a medium embodying a computer program for causing a computer to perform these operations, and a system for use in advertising includes a display and a processing system configured to perform these operations.

39 Claims, 6 Drawing Sheets

(56) References Cited

U.S. PATENT DOCUMENTS

| | | | |
|---|---|---|---|
| 7,634,785 B2 | 12/2009 | Smith | |
| 8,000,581 B2* | 8/2011 | Zalewski | 386/248 |
| 8,572,639 B2* | 10/2013 | Ficco | 725/14 |
| 8,879,891 B2* | 11/2014 | Zalewski | 386/248 |
| 2002/0013167 A1 | 1/2002 | Spaur | |
| 2004/0116183 A1 | 6/2004 | Prindle | |
| 2004/0162759 A1 | 8/2004 | Willis | |
| 2008/0102947 A1 | 5/2008 | Hays | |
| 2008/0114645 A1 | 5/2008 | Zalewski | |
| 2011/0274409 A1 | 11/2011 | Zalewski | |

OTHER PUBLICATIONS

Chinese Patent Office; First Office Action issued in Chinese Patent Application No. 200780049171.1, mailed May 11, 2011, 7 pages.
Chinese Patent Office; Second Office Action issued in Chinese Patent Application No. 200780049171.1, mailed May 23, 2012, 7 pages.
European Patent Office; Extended European Search Report issued in European Patent Application No. 07864231.1, mailed Dec. 17, 2010, 8 pages.
European Patent Office; Office Action issued in European Patent Application No. 07864231.1, mailed Mar. 5, 2014, 6 pages.
Japanese Patent Office; Notification of Reason(s) for Refusal issued in Japanese Patent Application No. 2009-536517, mailed Aug. 30, 2011, 3 pages.
Japanese Patent Office; Notification of Reason(s) for Refusal issued in Japanese Patent Application No. 2009-536517, mailed Jan. 10, 2012, 2 pages.
USPTO; Notice of Allowance issued in U.S. Appl. No. 11/558,348, mailed Mar. 22, 2011, 7 pages.
USPTO; Notice of Allowance issued in U.S. Appl. No. 11/558,348, mailed May 25, 2011, 4 pages.
USPTO; Notice of Allowance issued in U.S. Appl. No. 13/189,219, mailed Jul. 3, 2014, 5 pages.
USPTO; Notice of Allowance issued in U.S. Appl. No. 13/189,219, mailed Mar. 20, 2014, 5 pages.
USPTO; Office Action issued in U.S. Appl. No. 11/558,348, mailed Nov. 24, 2010, 8 pages.
USPTO; Office Action issued in U.S. Appl. No. 13/189,219, mailed Dec. 5, 2013, 10 pages.
World Intellectual Property Organization; International Preliminary Report on Patentability issued in International Application No. PCT/US2007/084309; mailed May 12, 2009, 5 pages.
World Intellectual Property Organization; International Search Report issued in International Application No. PCT/US2007/084309; mailed Apr. 28, 2008, 3 pages.
World Intellectual Property Organization; Written Opinion of the International Searching Authority issued in International Application No. PCT/US2007/084309; mailed Apr. 28, 2008, 4 pages.

* cited by examiner

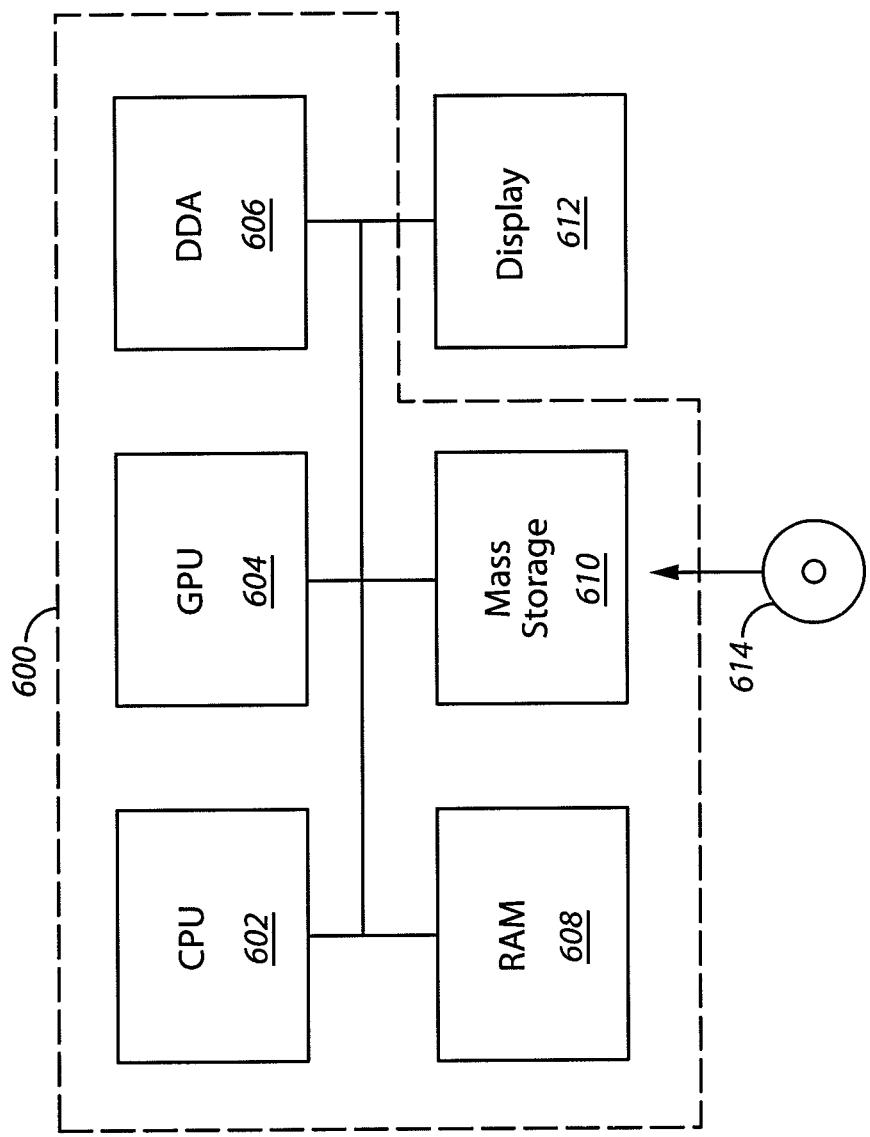

ADVERTISEMENT SCHEME FOR USE WITH INTERACTIVE CONTENT

CROSS-REFERENCE TO RELATED APPLICATIONS

This application is a continuation of U.S. patent application Ser. No. 13/189,219, filed on Jul. 22, 2011, entitled "ADVERTISEMENT SCHEME FOR USE WITH INTERACTIVE, CONTENT", which is a continuation of U.S. patent application Ser. No. 11/558,348, filed on Nov. 9, 2006, now U.S. Pat. No. 8,000,581, entitled "ADVERTISEMENT SCHEME FOR USE WITH INTERACTIVE CONTENT", the entire disclosures of which are both hereby fully incorporated by reference herein in their entireties.

BACKGROUND OF THE INVENTION

1. Field of the Invention

The present invention relates generally to advertising, and more specifically to advertising in interactive content, such as video games and the like.

2. Discussion of the Related Art

One traditional form of advertising is the television commercial. Such television commercials typically consist of brief advertising spots that range in length from a few seconds to several minutes. The commercials appear between shows and interrupt the shows at regular intervals. The goal of advertisers is to keep the viewer's attention focused on the commercial.

Advertising has also been used in video games. Such advertising often takes the form of advertisements that are inserted and placed on billboards, signs, etc., that are displayed in the scenes of the game.

It is with respect to these and other background information factors that the present invention has evolved.

SUMMARY OF THE INVENTION

One embodiment provides a method for use in advertising, comprising: initiating playing of interactive content; suspending playing of the interactive content; displaying an advertisement; and resuming playing of the interactive content.

Another embodiment provides a computer program product comprising a medium for embodying a computer program for input to a computer and a computer program embodied in the medium for causing the computer to perform steps of: initiating playing of interactive content; suspending playing of interactive content; displaying an advertisement; and resuming playing of the interactive content.

Another embodiment a system for use in advertising comprising: a display; a processing system configured to initiate playing of interactive content, suspend playing of the interactive content, display an advertisement on the display, and resume playing of the interactive content.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 6 is a block diagram illustrating a computer system that may be used to run, implement and/or execute the methods shown and described herein in accordance with embodiments of the present invention.

DETAILED DESCRIPTION

Embodiments of the present invention provide an advertisement scheme for use with interactive content, such as for example video games, entertainment software, or any other type of interactive content. In some embodiments, during game play, the game slows down, then stops, and a commercial is played. The user may be given an indication or other warning that a commercial is coming. By way of example, the indication may comprise a slowing down of the game play. This way, when the game slows down, the user knows to get ready for a commercial, the game then stops, and the commercial is played. After the commercial, the game resumes (i.e. starts again). In some embodiments the game may resume by slowly starting again, which allows the user to remember where he or she was in the game.

Figure 1:
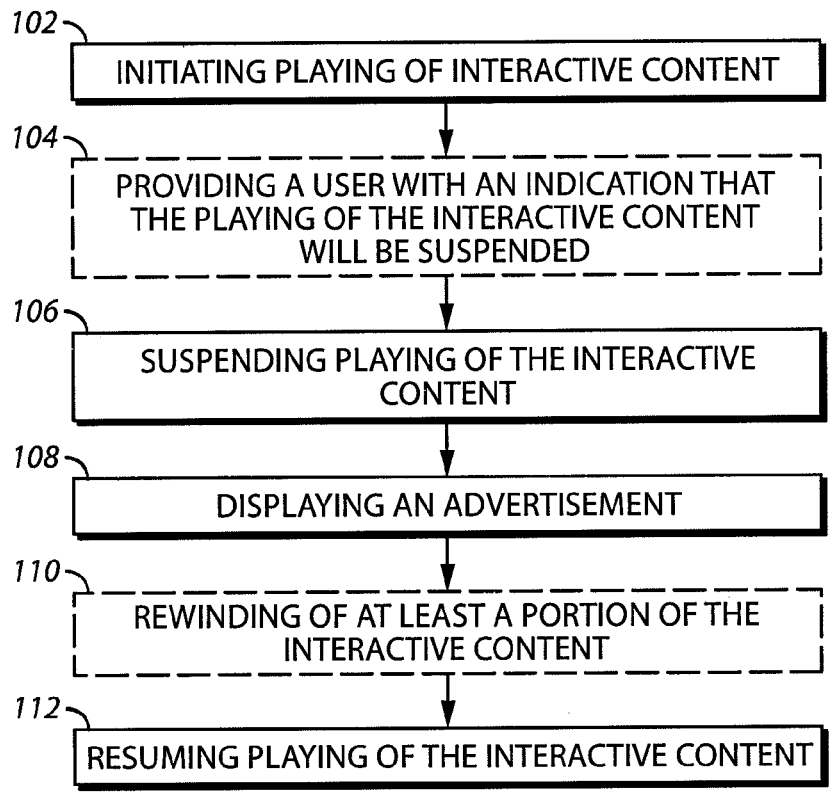
FIG. 1 is a flow diagram illustrating a method for use in advertising in accordance with an embodiment of the present invention.

Referring to FIG. 1, there is illustrated a method 100 that operates in accordance with an embodiment of the present invention. The method 100, which may be used in advertising, may be used in any interactive entertainment system or any content where the user interacts with the content.

The method 100 begins in step 102 where the playing of interactive content is initiated. In some embodiments, an optional step 104 may be used to provide the user with an indication that the playing of the interactive content will be suspended. In some embodiments, the indication may comprise a slowing down of the playing of the interactive content. For example, in some embodiments, the interactive content may be played in slow motion before being suspended. In other implementations, the slowing down of the content may be gradual so that the speed at which the interactive media is played is decreased until the playing of the interactive media is suspended.

Figure 2A:
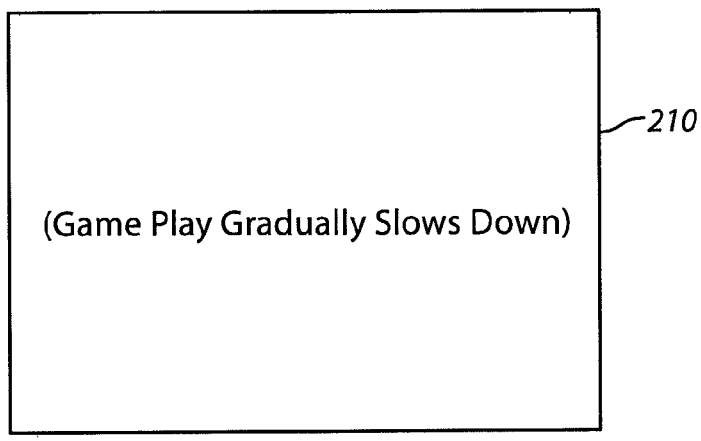
FIGS. 2A, 2B, 2C and 2D are screen shots illustrating example indications that the playing of the interactive content will be suspended that may be used in accordance with embodiments of the present invention.
Figure 2B:
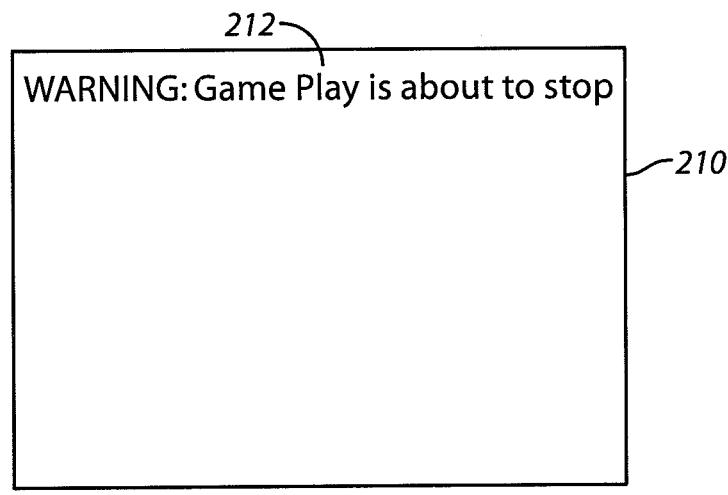
Figure 2C:
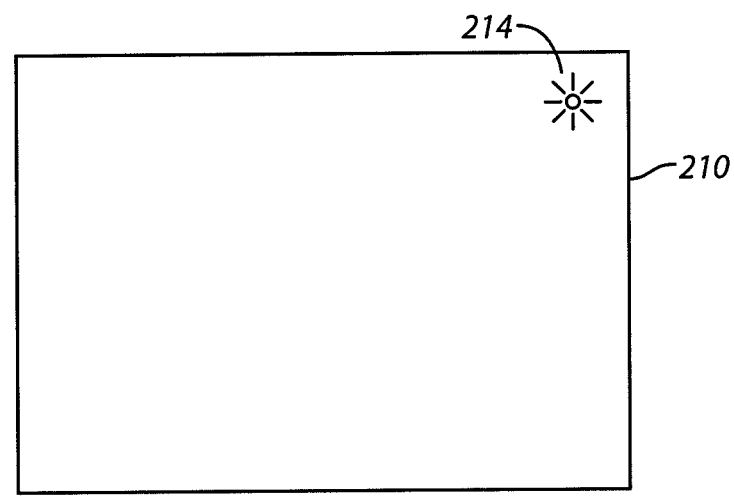
Figure 2D:
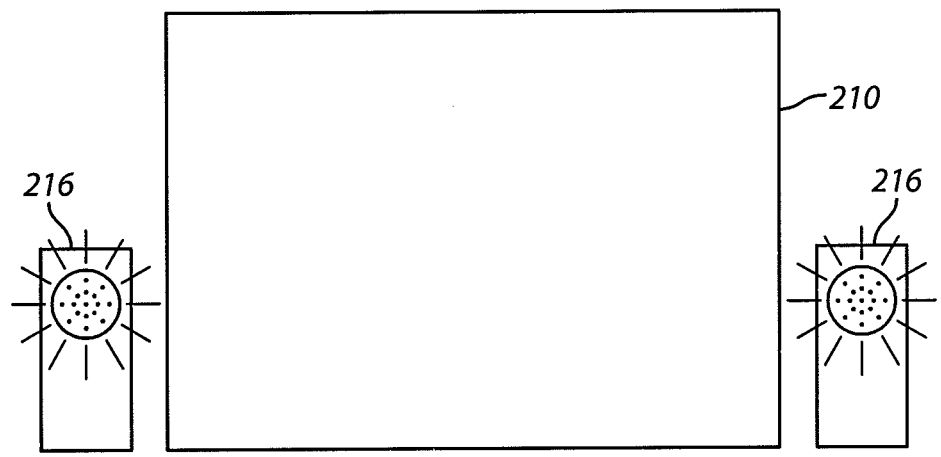

Various transmission mechanisms may optionally be used to couple player minds out of (and back into) the game environment. For example, in some embodiments, the indication provided in optional step 104 may comprise displaying a warning message, a notice, bell, audio signal, visual signal, audio-visual signal, or some other indication that alerts a user of an upcoming break, such as a commercial break, in the playing of the media content. FIGS. 2A, 2B, 2C and 2D illustrate example suspension indications that may be used in accordance with embodiments of the present invention. Namely, In FIG. 2A the game playing on client display device 210 may be gradually slowed down. In FIG. 2B a warning message 212 that the game play is about to stop may be displayed on the client display device 210. In FIG. 2C a visual warning signal such as a blinking light 214 may be used to indicate that game play is about to stop. In FIG. 2D an audio signal played through speakers 216 connected to the client device may be used to indicate suspension of playing of media.

In step 106 (FIG. 1) the playing of the interactive content is suspended. According to some embodiments, the playing of content may be suspended at predefined times. In other embodiments, suspension of playing of interactive content may, occur randomly. During step 106 when the playing of the interactive content is suspended, in some embodiments, a stop point may be recorded referring to the point at which the playing of the media content was suspended. This stop point may be the time within the media content where the playing of the content is suspended, or other such identifiers that may be used to identify the point within the media content at which the playing is suspended.

Figure 3:
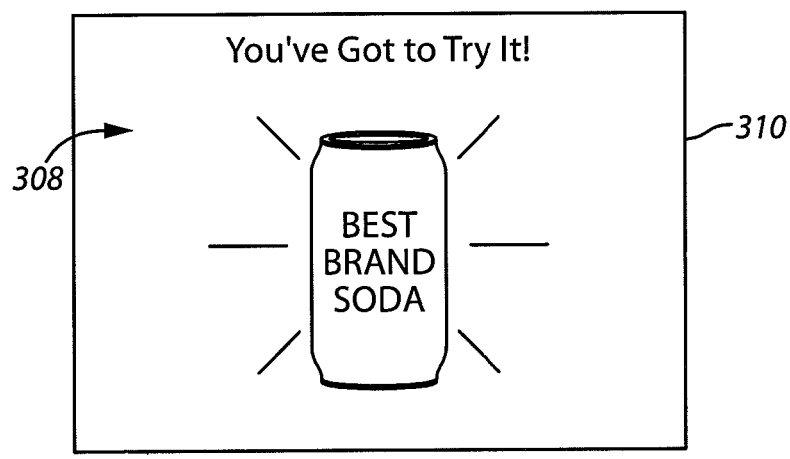
FIG. 3 is a screen shot illustrating an example advertisement that may be played in accordance with embodiments of the present invention.

In step 108 an advertisement is displayed. By way of example, the advertisement may be similar to a traditional TV commercial, or may comprise some other type of advertisement. For example, FIG. 3 illustrates an example advertisement 308 played on client display device 310. In this example the advertisement 308 is for "Best Brand Soda" having the slogan "You've Got to Try It"?. In some embodiments, the advertisement may be preselected, randomly chosen, selected based on demographics, selected based on a user profile or other criteria, or selected by some other process. In embodiments where interactive content is played on several client devices (discussed below), commercial advertisements may be played on one or more or all client devices. In some embodiments, the advertisement may be played on the whole screen. Thus, when the playing of interactive content is suspended, a commercial or other advertisement is played.

In some embodiments, a portion of the content may be replayed before resuming the playing of the interactive content. For example, as shown in optional step 110 (FIG. 1), at least a portion of the interactive content is rewound prior to the resuming playing of the interactive content. That is, a portion of the game may be rewound to replay the last few seconds or minutes slowly to allow the user to begin playing again. In some embodiments, the recorded stop point is used, so that a portion of the content before the content is played back in either normal speed or slow motion up to the stop point and normal playing of content is resumed after the stop point.

Figure 4A:
FIGS. 4A and 4B are screen shots illustrating example indications that the playing of the interactive content will be resumed that may be used in accordance with embodiments of the present invention.
Figure 4B:
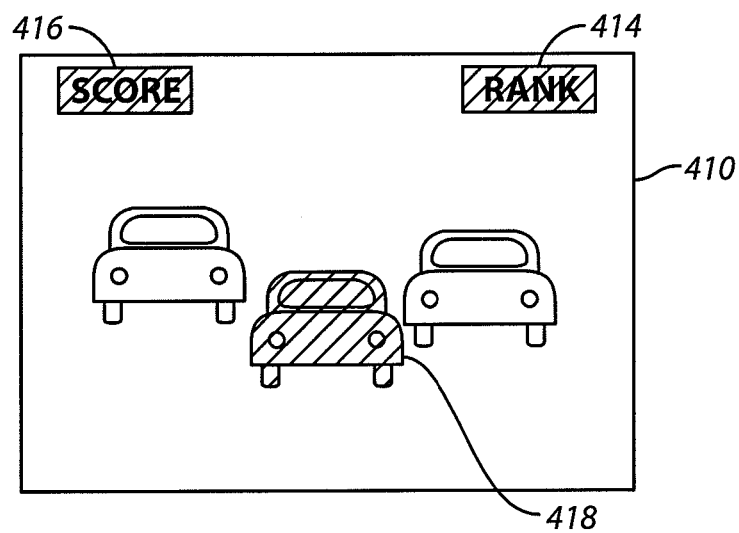

In some embodiments, an indication may be provided alerting the user that playback of the content is about to resume before resuming playing of the content. The indication may be a notice, an audio indication such as a bell, an audio visual signal, or other such indications. In some embodiments, objects, targets, scenes, players, scores, or other such information may be highlighted or animated to bring focus into key elements of the interactive content at the time of resuming playing of content. FIGS. 4A and 4B illustrate example resuming indications that may be used in accordance with embodiments of the present invention. Namely, In FIG. 4A a warning message 412 that the game play is about to resume may be displayed on the client display device 410. In FIG. 4B the rank 414, score 416 and/or object 418, such as an automobile, may be highlighted or animated to bring focus into those elements of the interactive content at the time of resuming playing of content.

Next, in step 112 (FIG. 1) the playing of the interactive content is resumed. In some embodiments a signal scheme may trigger and coordinate the resuming of playing of content to establish a safe and fair transition. Various transition mechanisms may be used to transition from a suspended state to resuming playing of the content. In some embodiments, the speed of the content may be increased until the speed returns to its normal speed. In some embodiments, the speeding up may be gradual to insure an effective transition.

Figure 5:
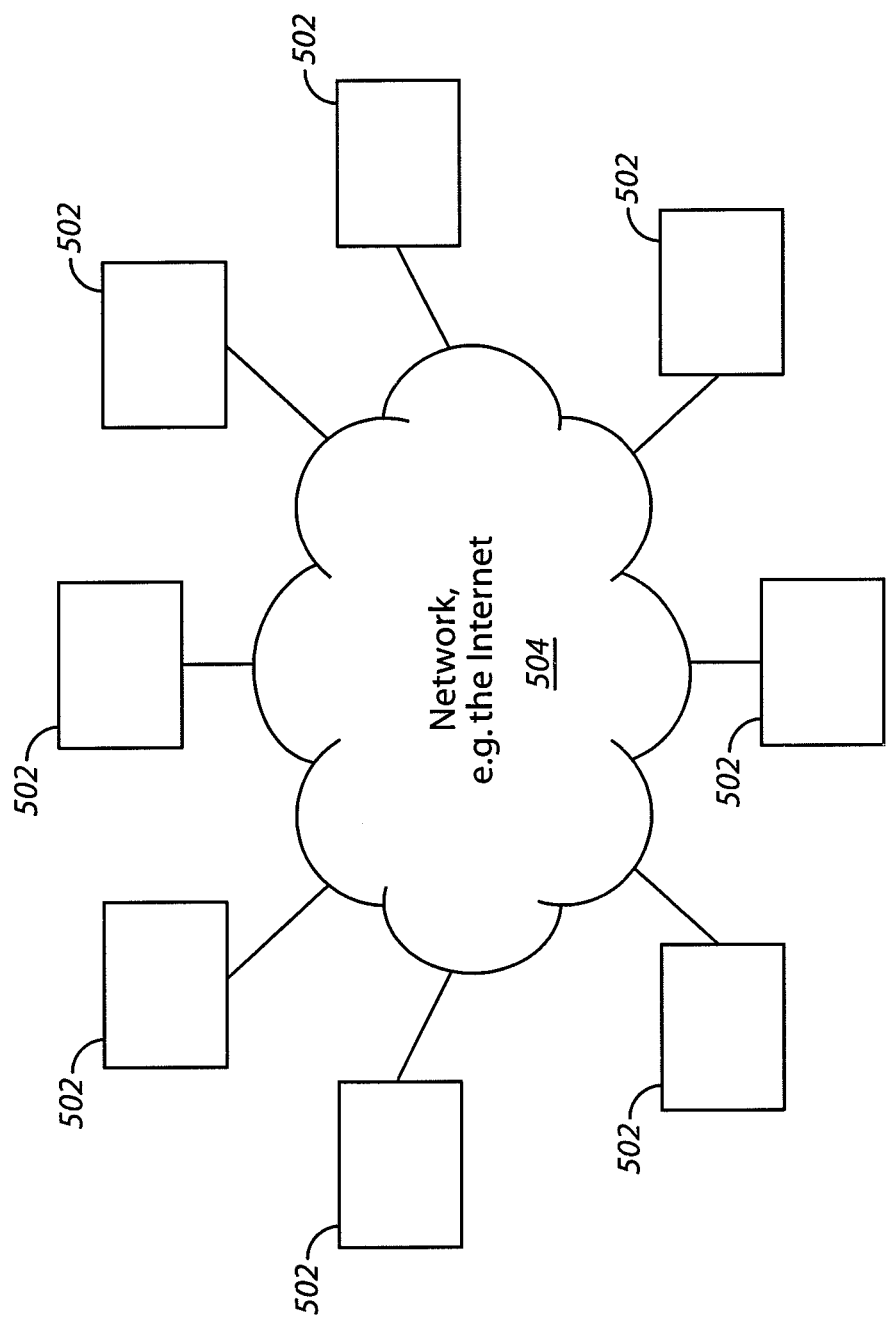
FIG. 5 is a block diagram illustrating a network that may be used to run, implement and/or execute the methods shown and described herein in accordance with embodiments of the present invention.

Embodiments of the present invention may be used in stand alone games or in network gaming environments. Referring to FIG. 5, there is illustrated a system 500 that may be used in implementing a network gaming environment in accordance with an embodiment of the present invention. In the system 500, a plurality of players are able to interact with each other, such as for example in a network game. This may be accomplished by each player operating a client device 502 that has access to a network 504, such as for example the Internet.

In some implementations, the gaming network may be synchronized using a signaling scheme where a signal is sent to all players on the network to suspend and play a game. Additionally, signals may be sent to facilitate slowing down or speeding up the playing of the content at the same time to provide a fair and simultaneous game play environment. Other synchronization schemes utilizing recording stop points and time stamps may be used in some embodiments. In network gaming one or more players may all see the same or different commercials when game play stops. In embodiments where different commercials are played synchronization schemes may be used to ensure that regardless of the commercial that is playing on each client device the game stops and resumes at the same time. Such synchronization schemes may also be used to ensure that the game stops and resumes in a similar manner at all client devices to ensure a fair playing environment.

In some embodiments, where a game is played over a network, suspension of the content, and optionally an indication, may be initiated when the server transmits a message to all game clients coordinating the state change. For example, in a network gaming framework, a signal may be transmitted to some or all players to indicate a break and to coordinate the break in all player units. In some embodiments, the signal scheme may trigger and coordinate game functions across the game environment to establish a safe and fair transition from active game play to a pause state. In some implementations, the points at which the suspending of the playing of the media takes place is pre-recorded and suspending of the content is initiated when the players encounter a stop point within the content. In some implementations, where media content is being played simultaneously on several client playback devices, a signal scheme, or other schemes, may be used to coordinate the suspension of the content on all devices. In other embodiments, the playing of the content may be suspended at random points. In some implementations a signal scheme may be used to send a signal causing all client devices to suspend playing of the content on all client apparatuses.

In embodiments where the content is displayed to multiple clients, the same advertisement may be played on all client devices, while in other embodiments different advertisements may be played on some or all of the client devices. The advertisements that are played on client devices may be randomly assigned to different devices, or in some implementations, the advertisements specific to some or all of the client devices, based on a user profile or other criteria, may be sent to those devices.

The methods and techniques described herein may be utilized, implemented and/or run on many different types of computers, graphics workstations, televisions, entertainment systems, video game systems, DVD players, DVRs, media players, home servers, video game consoles, and the like. Referring to FIG. 4, there is illustrated a system 400 that may be used for such implementations. However, the use of the system 400 is certainly not required.

By way of example, the system 600 may include, but is not required to include, a central processing unit (CPU) 602, a graphics processing unit (GPU) 604, digital differential analysis (DDA) hardware 606, a random access memory (RAM) 608, and a mass storage unit 610, such as a disk drive. The system 600 may be coupled to, or integrated with, a display 612, such as for example any type of display, including any of the types of displays mentioned herein.

The CPU 602 and/or GPU 604 may be used to execute or assist in executing the steps of the methods and techniques described herein, and various program content and images may be rendered on the display 612. Removable storage media 614 may optionally be used with the mass storage unit 610, which may be used for storing code that implements the methods and techniques described herein. However, any of the storage devices, such as the RAM 608 or mass storage unit 610, may be used for storing such code. Either all or a portion of the system 600 may be embodied in any type of device, such as for example a television, computer, video game console or system, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:
   initiating, through a processor based apparatus, playing of interactive content;
   suspending, through the processor based apparatus, playing of the interactive content;
   displaying an advertisement; and
   resuming playing of the interactive content;
   wherein the suspending playing of the interactive content comprises synchronizing the suspending playing of the interactive content among a plurality of users interacting with the interactive content.

2. The method of claim 1, wherein the interactive content is played over a network.

3. The method of claim 1, wherein the interactive content is configured to have the plurality of users interacting with the interactive content simultaneously.

4. The method of claim 1, wherein the suspending playing of the interactive content further comprises suspending playing of the interactive content for all of the plurality of users.

5. The method of claim 1, wherein the synchronizing the suspending playing of the interactive content comprises synchronizing the suspending playing of the interactive content so that the playing of the interactive content stops at a substantially same time for all of the plurality of users.

6. The method of claim 1, wherein the resuming playing of the interactive content comprises synchronizing the resuming playing of the interactive content so that the resuming playing of the interactive content starts at a substantially same time for all of the plurality of users.

7. The method of claim 1, wherein a same advertisement is displayed for all of the plurality of users.

8. The method of claim 1, wherein a different advertisement is displayed for at least one of the plurality of users.

9. The method of claim 1, wherein the advertisement is selected based on a user profile.

10. The method of claim 1, wherein the suspending playing of the interactive content is performed at a predefined time.

11. The method of claim 1, wherein the suspending playing of the interactive content is performed at a random time.

12. The method of claim 1, further comprising providing a user with an indication that the playing of the interactive content will be suspended.

13. The method of claim 12, wherein the indication comprises a warning message.

14. A computer program product comprising a non-transitory computer readable medium for embodying a computer program for input to a computer and a computer program embodied in the non-transitory computer readable medium for causing the computer to perform steps comprising:
    initiating playing of interactive content;
    suspending playing of the interactive content;
    displaying an advertisement; and
    resuming playing of the interactive content;
    wherein the suspending playing of the interactive content comprises synchronizing the suspending playing of the interactive content among a plurality of users interacting with the interactive content.

15. The computer program product of claim 14, wherein the interactive content is played over a network.

16. The computer program product of claim 14, wherein the interactive content is configured to have the plurality of users interacting with the interactive content simultaneously.

17. The computer program product of claim 14, wherein the suspending playing of the interactive content further comprises suspending playing of the interactive content for all of the plurality of users.

18. The computer program product of claim 14, wherein the synchronizing the suspending playing of the interactive content comprises synchronizing the suspending playing of the interactive content so that the playing of the interactive content stops at a substantially same time for all of the plurality of users.

19. The computer program product of claim 14, wherein the resuming playing of the interactive content comprises synchronizing the resuming playing of the interactive content so that the resuming playing of the interactive content starts at a substantially same time for all of the plurality of users.

20. The computer program product of claim 14, wherein a same advertisement is displayed for all of the plurality of users.

21. The computer program product of claim 14, wherein a different advertisement is displayed for at least one of the plurality of users.

22. The computer program product of claim 14, wherein the advertisement is selected based on a user profile.

23. The computer program product of claim 14, wherein the suspending playing of the interactive content is performed at a predefined time.

24. The computer program product of claim 14, wherein the suspending playing of the interactive content is performed at a random time.

25. The computer program product of claim 14, wherein the computer program embodied in the non-transitory computer readable medium is further configured for causing the computer to perform a step comprising:
    providing a user with an indication that the playing of the interactive content will be suspended.

26. The computer program product of claim 25, wherein the indication comprises a warning message.

27. A system, comprising:
a display; and
a processor based apparatus configured to initiate playing of interactive content, suspend playing of the interactive content, display an advertisement on the display, and resume playing of the interactive content;
wherein the suspending playing of the interactive content comprises synchronizing the suspending playing of the interactive content among a plurality of users interacting with the interactive content.

28. The system of claim 27, wherein the interactive content is played over a network.

29. The system of claim 27, wherein the interactive content is configured to have the plurality of users interacting with the interactive content simultaneously.

30. The system of claim 27, wherein the suspending playing of the interactive content further comprises suspending playing of the interactive content for all of the plurality of users.

31. The system of claim 27, wherein the synchronizing the suspending playing of the interactive content comprises synchronizing the suspending playing of the interactive content so that the playing of the interactive content stops at a substantially same time for all of the plurality of users.

32. The system of claim 27, wherein the resuming playing of the interactive content comprises synchronizing the resuming playing of the interactive content so that the resuming playing of the interactive content starts at a substantially same time for all of the plurality of users.

33. The system of claim 27, wherein a same advertisement is displayed for all of the plurality of users.

34. The system of claim 27, wherein a different advertisement is displayed for at least one of the plurality of users.

35. The system of claim 27, wherein the advertisement is selected based on a user profile.

36. The system of claim 27, wherein the suspending playing of the interactive content is performed at a predefined time.

37. The system of claim 27, wherein the suspending playing of the interactive content is performed at a random time.

38. The system of claim 27, wherein the processor based apparatus is further configured to provide a user with an indication that the playing of the interactive content will be suspended.

39. The system of claim 38, wherein the indication comprises a warning message.

* * * * *